United States Patent [19]

Yoshida et al.

[11] Patent Number: 4,797,319

[45] Date of Patent: Jan. 10, 1989

[54] GLAZED CEMENT PRODUCT AND METHOD FOR MANUFACTURING THEREOF

[75] Inventors: Shigeo Yoshida, Shiga; Satoshi Kitagawa, Yokaichi; Shozo Harada, Handa; Tetsuya Koide, Nagoya; Manabu Hasegawa, Chita, all of Japan

[73] Assignees: National House Industrial Co., Ltd., Osaka; INAX Corporation, Aichi, both of Japan

[21] Appl. No.: 816,533

[22] Filed: Jan. 6, 1986

[30] Foreign Application Priority Data

Jan. 29, 1985 [JP] Japan .................................. 60-16103

[51] Int. Cl.[4] ...................... B29C 39/10; B29C 67/12; B32B 13/04; C04B 7/02

[52] U.S. Cl. .................................. 428/312.4; 106/86; 106/99; 264/133; 264/228; 264/229; 428/312.6; 428/312.8; 428/447; 428/469; 428/703

[58] Field of Search ................ 264/62, 133, 231, 229, 264/228; 427/376.2; 428/703, 447, 312.4, 312.6, 312.8, 469; 106/86, 99, DIG. 2

[56] References Cited

U.S. PATENT DOCUMENTS

| | | | |
|---|---|---|---|
| 1,684,663 | 9/1928 | Dill | 264/228 |
| 2,319,105 | 5/1943 | Billner | 264/27 |
| 2,562,477 | 7/1951 | Ramsay | 264/62 |
| 3,489,626 | 1/1970 | Rubenstein | 156/86 |
| 4,407,769 | 10/1983 | Harada et al. | 264/60 |

FOREIGN PATENT DOCUMENTS 5648464 11/1981 Japan .

*Primary Examiner*—Jan H. Silbaugh
*Assistant Examiner*—Karen D. Kutach
*Attorney, Agent, or Firm*—Armstrong, Nikaido, Marmelstein & Kubovcik

[57] ABSTRACT

Method for manufacturing glazed cement products of a foam light-weight aggregate, reinforcing steel under pretension or a stress-absorbing layer around the reinforcing steel. An action of generating crack, caused by a difference of coefficient of thermal expansion between the reinforcing steel and a portion of cement material while burning and cooling are carried out, is absorbed by the foam light-weight aggregate, the stress-absorbing layer or pretension given to the reinforcing steel. A reaction of unreacted cement component is promoted by the hydration to harden for recovering mechanical strength.

12 Claims, 4 Drawing Sheets

4,797,319

GLAZED CEMENT PRODUCT AND METHOD FOR MANUFACTURING THEREOF

BACKGROUND OF THE INVENTION

The present invention relates to a glazed cement product and method for manufacturing thereof wherein the glazed cement product can be obtained by applying a glaze onto the surface of a molded body of cement, burning the glazed body and hydrating the burned body to harden, and improved in the strength of a molded body of cement by using, for example, prestressed concrete steel.

Hitherto, there is employed a method of laying reinforcing steel within a glazed cement product in order to increase the strength thereof. The product can be obtained by the following steps.

At first, a kneaded mixture of cement comprizing cement, aggregate, water and the like is poured into a form wherein reinforcing steel is laid beforehand. Next, the resulting molded body of cement is hardened by curing in air for a prescribed time. Then the molded body of cement is applied a glaze onto the surface thereof, burned at a prescribed temperature and cooled in air. At the end, the burned molded body of cement is hydrated to harden for manufacturing a glazed cement product.

However, in case of manufacturing the above-mentioned conventional product, there is generated a thermal stress while burning and cooling are carried out between reinforcing steel and the portion of cement material caused by the difference of coefficient of thermal expansion between them, whereby cracks are generated within the portion of cement material. For example, the coefficient of thermal expansion of reinforcing steel is about $17.3\times10^{-6}$°$C^{-1}$ and that of a molded body of cement is about 7 to $10\times10^{-6}$°$C^{-1}$ which, of course, varies depending on the types of aggregate used or mixing ratio of cement, aggregate and water. Accordingly the reinforcing steel expands about twice as much as a molded body of cement. As a result, the conventional product has problems that the strength thereof decreases against expectation of inceasing the strength thereof by reinforcing steel.

Accordingly, it is an object of the present invention to improve or remove the above-mentioned conventional drawbacks, and provide a glazed cement product wherein the generation of cracks is controlled and method for manufacturing thereof.

SUMMARY OF THE INVENTION

According to the present invention, there are provided a method for manufacturing a glazed cement product comprizing the steps in sequence of:

(a) preparing a kneaded mixture of cement,
(b) pouring the resulting kneaded mixture into a form or on a bed wherein reinforcing steel is laid,
(c) molding a molded body of cement,
(d) curing the molded body of cement,
(e) applying a glaze onto a surface of the cured molded body of cement,
(f) burning the glazed molded body of cement,
(g) cooling the burned mold body of cement,
(h) hydrating to harden the cooled molded body of cement, characterized in that an action of generating crack while burning and cooling caused by a difference of coefficient of thermal expansion between reinforcing steel and a portion of cement material is absorbed by a stress-absorbing portion around reinforcing steel, and a reaction of unreacted cement component is promoted by hydration to harden for recovering mechanical strength; and a glazed cement product manufactured in accordance with the method.

The glazed cement product of the present invention can improve its mechanical strength by means of reinforcing steel, for example, and hydration to harden after burning step. That is to say, the glazed cement product of the present invention can realize the combination of two techniques which has not been possible hitherto, whereby the excellent mechanical strength can be obtained.

The above and other objects of the invention will be seen by reference to the description taken in connection with the accompanying drawings.

DETAILED DESCRIPTION

Figure 1:
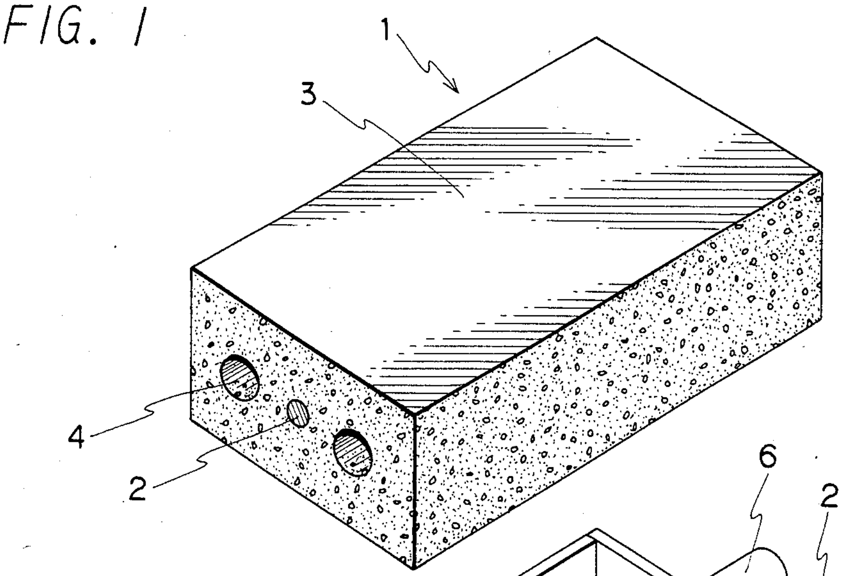
FIG. 1 is a perspective view of an embodiment of a glazed cement product of the present invention.

FIG. 1 is a perspective view of an embodiment of a glazed cement product 1 of the present invention. In FIG. 1, numeral 2 is reinforcing steel, numeral 3 is a glazed portion applied a glaze thereon and numeral 4 is a cavity for lightening the product 1 and containing metal works to be inserted therein. In manufacturing this kind of cement product, a kneaded mixture of cement is prepared at first. The kneading of the mixture of cement can be carried out by using depositing machine.

The mixing ratio of the kneaded mixture of cement and the kinds of materials mixed are appropriately selected in accordance with shape, use, and the like of cement products.

Next, the mixture of cement kneaded in such a manner as described above is poured into a form 5 in order to be cured in air for prescribed time. Reinforcing steel 2 and a core 6 for forming the cavity 4 are laid in the form 5 beforehand. The core 6 is made of steel, synthetic resin, and the like.

As a method for manufacturing molded body of cement 7, an immediate stripping method of construction is employable besides a pouring method. This immediate stripping method of construction comprizes steps of placing a kneaded mixture of cement on a bed in succession, curing resulting molded body and cutting the cured molded body in a prescribed dimension.

Figure 4:
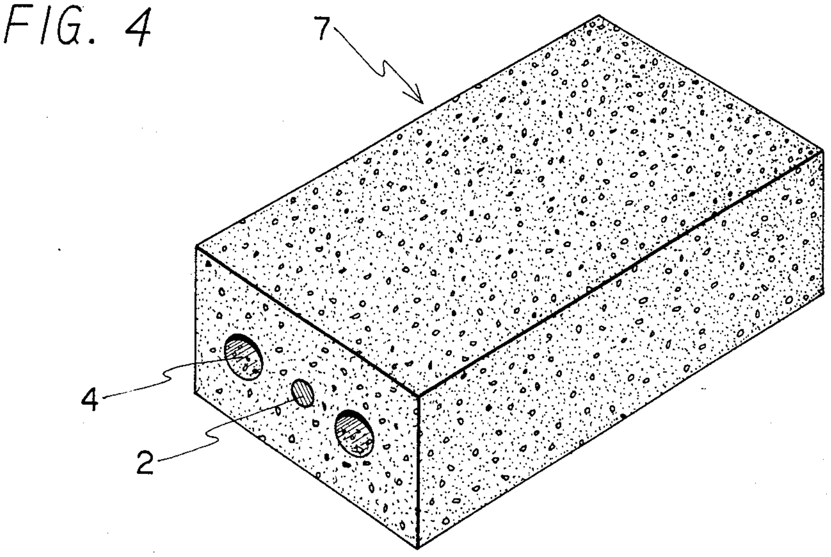
FIG. 4 is a perspective view of a molded body of cement in the present invention.
Figure 5:
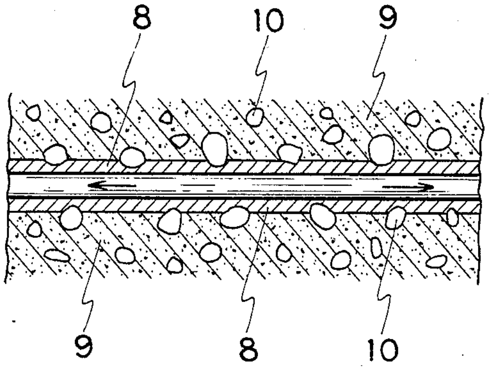
FIGS. 5 and 6 are schematic vertical sectional views of the molded body of cement in the present invention showing a principle of absorption of thermal stress generated while burning is carried out.
Figure 6:
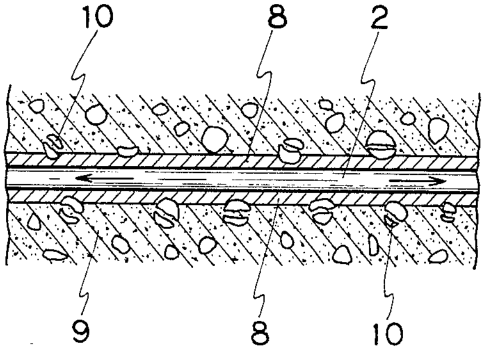

The curing methods are not necessarily limited to those described above. The degree of hardening is required to such an extent that the molded body of cement 7 (shown in FIG. 4) maintains its shape sufficiently and there is occurred a slide between the reinforcing steel and the portion of cement material.

After curing is carried out, the form 5 is stripped and the resulting molded body of cement 7 is dried by heating at a temperature of 50° to 300° C. for 3 to 72 hours. The heating temperature and time vary depending on the thickness of product, season, and the like.

After being dried, the molded body of cement 7 is applied a glaze onto the surface thereof so as to be burned in a roller hearth kiln, for example.

The drying step can be carried out independently, but it can also be carried out in succession without interrupting in such a manner that drying is carried out in the pre-heating zone and then burning is carried out in the burning zone in the kiln used in the following step.

As described above, while burning step is carried out, there is generated a thermal stress between the reinforcing steel 2 and the portion of cement material 9 caused by the difference of coefficient of thermal expansion between them. The thermal stress tends to generate crack between the reinforcing steel 2 and the portion of cement material 9. However, this kind of thermal stress is absorbed by means of stress-absorbing portion, i.e. foam light-weight aggregate 10 and/or a stress-absorbing layer 8.

That is to say, foam light-weight aggregate 10 contained in the kneaded mixture of cement is destroyed or compressed by above-mentioned thermal stress so as to cause a slide between the portion of cement material 9 and the stress-absorbing layer 8, whereby the thermal stress is dispersed to prevent crack. As a result, there is generated no crack in the stress-absorbing layer 8 and the portion of cement material 9.

The stress-absorbing layer 8 acts like foam light-weight aggregate 10, that is to say, plays a part in absorbing a slide caused by the difference of coefficient of thermal expansion between the reinforcing steel 2 and the portion of cement material 9.

The above-mentioned two means (i.e. foam light-weight aggregate and the stress-absorbing layer) can be employed individualy, but joint use thereof are more effective to prevent the generation of crack.

Examples employed as stress-absorbing layer are mortar layer such as pearlite mortal and vermiculite mortar, glass, plastic, and the like.

Examples employed as foam light-weight aggregate are natural light-weight aggregate such as volcanic gravel, pumice and lava, artificial light-weight aggregate such as pearlite powder, and industrial by-product such as coal ash and slag.

After being burned, the molded body of cement 7 is cooled in air. In cooling period there also generates thermal stress between the reinforcing steel 2 and the portion of cement material 9. However such thermal stress is absorbed in such a manner as described above by the stress-absorbing portion (i.e. stress-absorbing layer and foam light-weight aggregate).

After being cooled, the molded body of cement 7 is dipped in water for about 10 to 60 minutes in order to absorb moisture. The dipping time is not limited to this range and varies depending on the thickness of product, season, and the like. Further showering method can also be employed since the main purpose of this step is to supply water to products from which water is left out while burning. However, this step of dipping in water is carried out for rapid absorption of moisture and is omittable.

Finally, the molded body of cement 7 is hydrated to harden. In hydrating to harden, appropriate methods such as steam curing, dipping in water and water spray curing are employable. Various conditions such as temperature and time for curing are determined in consideration of initial cost, curing cost and performance of product, and the like.

The hydration for curing of the glazed cement product 1 obtained in such a manner as described above, the strength of the product 1 being decreased by dehydration in the layer of hydrate on burning, lets water get into hydrate through its shell broken while burning is carried out so as to promote the reaction of unreacted cement component, which enables to reveal the strength of cement product 1. Further the strength of cement product is recovered since hydrate created during hydration for curing fill up gaps generated while burning is carried out. Accordingly the strength of cement product 1 of the present invention is almost equal to usual cement products which are obtained by hydrating to harden unburned molded bodies. This technique of hydration to harden has already been known in the specification of Japanese Examined Patent Publication No. 48464/1981, the invention was developed by us.

In the present invention, pretension can be given to reinforcing steel beforehand when the kneaded mixture is poured into a form or on a bed in order to effectively prevent the generation of crack between reinforcing steel and the portion of cement material while burning is carried out. In this case, prestressed concrete steel such as prestressed concrete wire, or prestressed concrete bar is preferably employed. Pretension given to the prestressed concrete steel varies depending on the strength of molded body of cement. In case that the pretension is too small, the generation of crack can not be sufficiently prevented. On the other hand, in case that the pretension is too large cement products are destroyed since the strength molded body of cement decreases with a rise in burning temperature.

Prestressed concrete steel is compulsorily extended because of the pretension given to it. Therefore, while burning is carried out, with respect to the expansion of prestressed concrete steel to such an extent within the extension thereof caused by pretension, the prestressed concrete steel tends to absorb the expansion by way of extension thereof. That is to say, provided that the extension of 10 mm is given to prestressed concrete steel by means of pretension, the prestressed concrete steel absorb the expansion by extension thereof until the expansion caused by heating exceeds 10 mm. Accordingly, an apparent length of prestressed concrete steel is constant whereby there is avoided an action of generating crack between prestressed concrete steel and the portion of cement material 9.

After burning, the pretension given to the prestressed concrete steel is lost. Accordingly the thermal stress generated while cooling is carried out is absorbed by means of stress-absorbing layer generated by the fall of strength of the portion of cement material. That is to say, in case of giving pretension to prestressd concrete steel, the thermal stress generated while burning is absorbed by the extension which is compulsorily given to prestressed concrete steel, and the thermal stress generated while cooling is absorbed by stress-absorbing layer.

As described above, the pretension in the present invention is different from conventional pretension for reinforcement in viewpoint of purpose, action and effect.

A glazed cement product of the present invention is manufactured according to the following method, for example.

At first a kneaded mixture of cement is prepared by using pearlite aggregate as foam light-weight aggregate. The mixing ratio of the kneaded mixture of cement is as follows:

| | |
|---|---|
| ordinary portland cement | 35.8 parts by weight |
| pearlite aggregate | 45.8 parts by weight |
| pearlite powder | 18.2 parts by weight |
| water reducing agent | 0.2 parts by weight |
| water (water-cement ratio) | 0.51 |

The kneading of the mixture of cement is carried out by using depositing machine.

Figure 2:
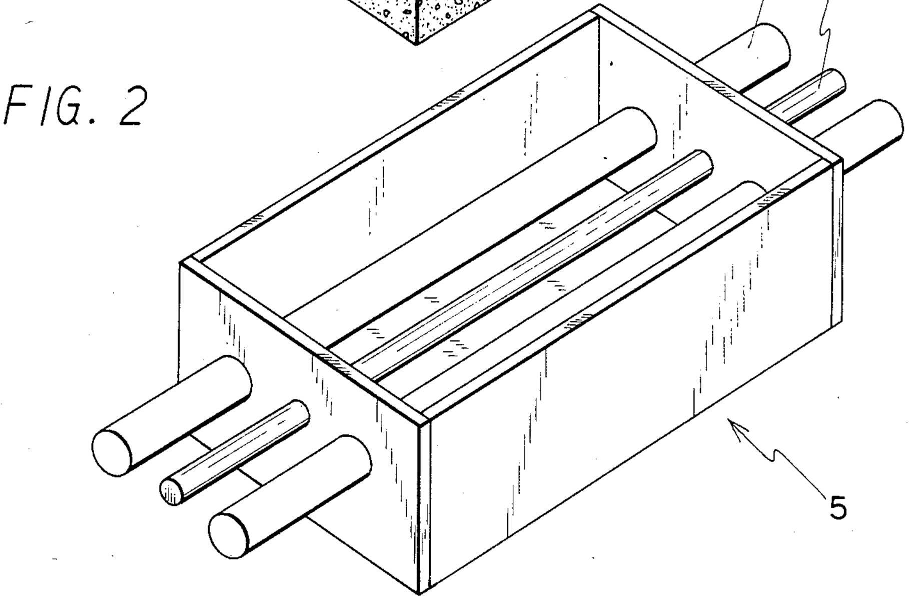
FIG. 2 is a perspective view of a form including reinforcing steel used in manufacturing the glazed cement product shown in FIG. 1.
Figure 3:
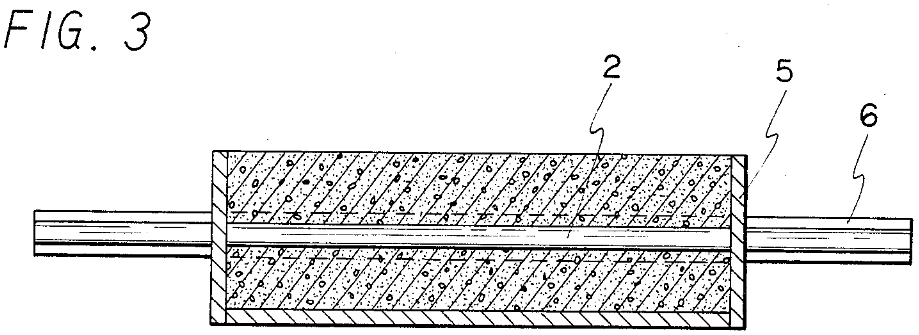
FIG. 3 is a vertical sectional view of the form of FIG. 2 wherein a kneaded mixture of cement is poured.

Next, the mixture of cement kneaded in such a manner as described above is poured into a form as shown in FIGS. 2 and 3 in order to be cured in air for 4 hours. Prestressed concrete steel of 2.9 mm in diameter is laid under pretension in the form beforehand. The pretension given to the steel is 0.5 t.

After curing is carried out, the form is stripped and the resulting molded body of cement is dried by heating at a temperature of 200° C. for 2 hours. After being dried, the molded body of cement is applied a glaze onto the surface thereof so as to be burned in a roller hearth kiln, for example, at a temperature of 850° C. for 1 hours. The roller hearth kiln used in the embodiment is such that the internal width was 80 cm, the height from the roller is 20 cm and the length is 30 m.

After being burned, the molded body of cement is dipped in water for 10 minutes in order to absorb moisture.

Finally the molded body of cement is placed in a curing room and cured in steam for 3 days at a temperature of 60° C. and relative humidity of 95% for being hydrated to harden.

EXAMPLE 1

A glazed cement product was produced under the conditions shown in Table 1. The type of cement employed was ordinary portland cement, water reducing agent used was 0.5% by weight to cement, cement-aggregate ratio in volume was 1 to 4 and water-cement ratio was 45% by weight. As a reinforcing steel, stranded steel wire comprising two prestressed steel wire of 2.9 mm in diameter was employed.

The above-mentioned five conditions were the same as in Examples 2 to 4 and Comparative Examples 1 to 6.

At first a kneaded mixture of cement was prepared under the conditions shown in Table 1 and described above.

TABLE 1

| | Aggregate | Specific gravity of concrete | Compressive strength (kg/cm$^2$) |
|---|---|---|---|
| Example 1 | Foamed soda glass | 1.2 | 120 |
| Example 2 | Foamed shale | 1.4 | 240 |
| Example 3 | Porcelain chamotte | 1.9 | 470 |
| Example 4 | Porcelain chamotte | 1.9 | 470 |
| Comparative Example 1 | Foamed shale | 1.4 | 240 |
| Comparative Example 2 | Foamed shale | 1.4 | 240 |
| Comparative Example 3 | Foamed shale | 1.4 | 240 |
| Comparative Example 4 | Porcelain chamotte | 1.9 | 470 |
| Comparative Example 5 | Porcelain chamotte | 1.9 | 470 |
| Comparative Example 6 | Porcelain chamotte | 1.9 | 470 |

The kneading of the mixture of cement was carried out by using depositing machine.

Next, the mixture of cement kneaded was poured into a form in order to be cured in air for 24 hours. Stranded steel wire was laid in the form beforehand. The pretension was not given to stranded steel wire.

After curing was carried out, the form was stripped and the resulting molded body of cement was dried by heating at a temperature of 300° C. for 4 hours. After being dried, the molded body of cement was burned in a roller hearth kiln at a temperature of 880° C. for 2 hours.

After being burned, the molded body of cement was dipped in water for 10 minutes in order to absorb moisture.

Finally the molded body of cement was placed in a curing room and cured in steam for 1 day at a temperature of 60° C. and relative humidity of 100% for being hydrated to harden.

Figure 7:
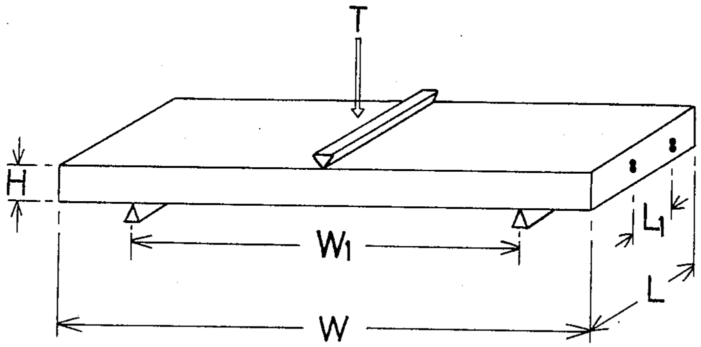
FIG. 7 is a perspective view showing a state of bending test of a molded body of cement.

The obtained cement product is shown in FIG. 7. In FIG. 7, dimensions of W, $W_1$, L, $L_1$ and H are as follows:

W: 1200 mm
$W_1$: 900 mm
L: 270 mm
$L_1$: 100 mm
H: 66 mm

With respect to obtained cement product, the strength of a molded body of cement was measured based on JIS A 1408 in order to confirm the effect of pretension given to stranded steel wire. The load was applied on the line T shown in FIG. 7. The results are summarized in Table 2.

Test pieces (Example 1) were obtained by cutting the cement product shown in FIG. 7 with diamond cutter.

Figure 8:
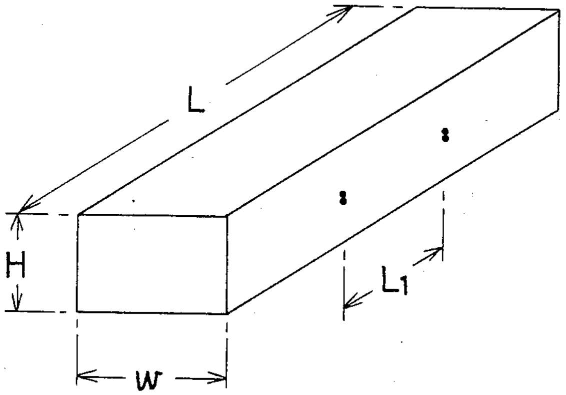
FIG. 8 is a perspective view of a test piece for measuring propagation velocity.

The obtained test piece is shown in FIG. 8. In FIG. 8, dimensions of ω, L, $L_1$ and H are as follows:

ω: 100 mm
L: 270 mm
$L_1$: 100 mm
H: 66 mm

EXAMPLE 2

The procedure of Example 1 was repeated except that pretension of 1.5 ton was given to stranded steel wire and foamed shale was employed as aggregate instead of foamed soda glass.

EXAMPLE 3

The procedure of Example 1 was repeated except that pretension of 1.8 ton was given to stranded steel wire and porcelain chamotte was employed as aggregate instead of foamed soda glass.

COMPARATIVE EXAMPLES 1 TO 3

The procedure of Example 2 was repeated except that pretension was not given to stranded steel wire (Comparative Example 1), pretension of 1.0 ton was given (Comparative Example 2) and pretension of 1.8 ton was given (Comparative Example 3).

COMPARATIVE EXAMPLES 4 AND 5

The procedure of Example 3 was repeated except that pretension was not given to stranded steel wire (Comparative Example 4) and pretension of 2.7 ton was given (Comparative Example 5).

EXAMPLE 4

The procedure of Example 3 was repeated except that reinforcing steel of 6 mm in diameter without pretension was employed instead of stranded steel wire and mortar layer of 3 to 5 mm in thickness was coated around reinforcing steel by dipping reinforcing steel into kneaded pearlite mortar beforehand (cement-aggregate ratio in volume was 1 to 4).

COMPARATIVE EXAMPLE 6

The procedure of Example 4 was repeated except that mortar layer was not coated around reinforcing steel.

Figure 9:
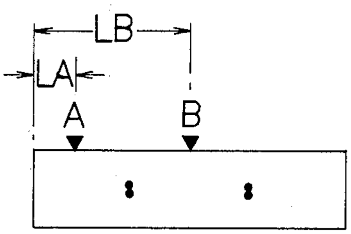
FIG. 9 is a side view of Examples 1 to 3 showing crack generated while burning and cooling are carried out, and measuring points of propagation velocity of ultrasound.

With respect to above-mentioned Examples 1 to 4 and Comparative Examples 1 to 6, the generation of crack was observed by naked eyes. The states of the generation of crack are shown in FIGS. 9 to 16. FIG. 9 corresponds to Examples 1 to 3, FIG. 10 to Comparative Example 1, FIG. 11 to Comparative Example 2, FIG. 12 to Comparative Example 3, FIG. 13 to Comparative Example 4, FIG. 14 to Comparative Example 5, FIG. 15 to Example 4 and FIG. 16 to Comparative Example 6, respectively.

Further, propagation velocity was measured by using ultrasound. The measurment was carried out with respect to two test pieces and valued by the average. The measuring points are shown in FIG. 9, which are the same as in FIGS. 10 to 16. In FIG. 9, AL is 40 mm and BL is 135 mm. The result are summarized in Table 2.

TABLE 2

| | Propagation velocity at measuring point A [km/sec] | Propagation velocity at measuring point B [km/sec] | *Load of unburned molded body of cement at generation of crack Pcr [kg/cm$^2$] |
|---|---|---|---|
| Example 1 | 2.55 | 2.56 | |
| Example 2 | 2.72 | 2.71 | 300 |
| Example 3 | 2.93 | 2.91 | 230 |
| Example 4 | 2.92 | 2.92 | |
| Comparative Example 1 | 2.10 | 2.73 | 130 |
| Comparative Example 2 | 2.21 | 2.74 | 250 |
| Comparative Example 3 | 2.70 | 2.05 | 320 |
| Comparative Example 4 | 2.35 | 2.92 | 182 |
| Comparative Example 5 | 2.33 | 2.29 | 300 |
| Comparative Example 6 | 2.32 | 2.90 | |

*Measured in order to confirm the effect of pretension given to strand steel wire.

Figure 13:
FIGS. 10 to 14 are side views of Comparative Examples 1 to 5 respectively showing crack generated while burning and cooling are carried out.
Figure 10:
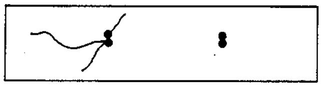
Figure 14:
Figure 11:
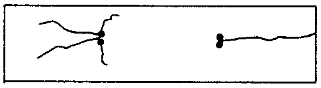

From FIGS. 9 and 13, it is found that the use foam light-weight aggregate is effective in preventing the generation of crack caused by thermal stress while burning and cooling. From FIGS. 9 and 10, however, it is also found that the type of foam light-weight aggregate is limited in case of using only foam light-weight aggregate without either using mortar layer (stress-absorbing layer) or giving pretension to stranded steel wire.

From FIGS. 9 to 12, and FIGS. 9, 13 and 14, it is found that it is effective to give pretension to stranded steel wire in order to absorb thermal stress. It is furthermore found that preferable range of pretension exists corresponding to the strength of molded body of cement. That is to say, in FIGS. 12 and 14, there is generated crack between two stranded steel wire from the upper surface of test piece to the lower surface thereof. This crack occurs because of excessive pretension whereby test pieces are destroyed with the fall of the strength of molded body of cement while burning temperature rises.

Figure 15:
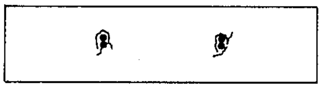
FIGS. 15 and 16 are side views of the Example 4 and Comparative Example 6 respectively showing crack generated while burning and cooling are carried out.
Figure 12:
Figure 16:

From FIGS. 15 and 16, it is found that the use of mortar layer is effective in preventing the generation of crack. The crack observed in FIG. 15 in fact occurred only in mortar layer. For the sake of easy understanding of generation of crack, the crack is illustated more outside than it really is.

From Table 2, the above-mentioned description can be confirmed numericaly. The propagation velocity lessens on account of the existence of crack.

According to the present invention, the generation of crack between reinforcing steel and the portion of cement material can be effectively absorbed by means of stress-absorbing portion and/or pretension given to reinforcing steel.

What is claimed is:

1. A method of manufacturing a glazed cement product comprising the steps in sequence of:
   (a) preparing a kneaded mixture of cement,
   (b) pouring the resulting kneaded mixture into a form or on a bed wherein reinforcing steel is laid,
   (c) molding a molded body of the cement,
   (d) curing the molded body of cement,
   (e) applying a glaze onto a surface of the cured molded body of cement, (f) burning the glazed molded body of cement, (g) cooling the burned molded body of cement, (h) hydrating to harden the cooled molded body of cement, wherein the action of generating cracks while burning and cooling, which is caused by the difference between the coefficient of thermal expansion between the reinforcing steel and a portion of the cement material, is absorbed by a stress absorbing portion around the reinforcing steel, the stress absorbing portion comprising a stress absorbing layer of pearlite power mortar coated on the reinforcing steel; and a reaction of an unreacted cement component is promoted by the hydration to harden for recovering mechanical strength.

2. A glazed cement product manufactured according to claim 1.

3. A method of claim 1, wherein the reinforcing steel is prestressed before the kneaded mixture is poured into the form or bed, and wherein the action of generating cracks during the burning steps is absorbed by the prestressing given to the reinforcing steel.

4. A glazed cement product m;aunfactured according to claim 3.

5. A method of manufacturing a glazed cement product comprising the steps in sequence of:

(a) preparing a kneaded mixture of cement, (b) pouring the resulting kneaded mixture into a form or on a bed wherein reinforcing steel is laid to form a stress absorbing portion of the cement about the reinforcing steel, (c) molding a molded body of the cement, (d) curing the molded body of cement, (e) applying a glaze onto a surface of the cured molded body of cement, (f) burning the glazed molded body of cement (g) cooling the burned molded body of cement, (h) hydrating to harden the cooled molded body of cement, wherein the action of generating cracks while burning and cooling, which is caused by the difference between the coefficient of thermal expansion between the reinforcing steel and a portion of the cement material, is absorbed by a stress absorbing portion around the reinforcing steel, the stress absorbing portion comprising foam lightweight aggregate which includes at least one member selected from the group consisting of volcanic gravel, pumice, lava, pearlite powder, pearlite aggregate, foamed soda glass, foamed shale, coal ash and slag; and a reaction of an unreacted cement component is promoted by the hydration to harden for recovering mechanical strength.

6. A glazed cement product manufactured according to claim 5.

7. A method of claim 5, wherein the reniforcing steel is prestressed before the kneaded mixture is poured into the form or bed, and wherein the action of generating cracks during the burning step is absorbed by the prestressing given to the reinforcing steel.

8. A glazed cement product manufactured aocording to claim 7.

9. A method of manufacturing a glazed cement product comprising the steps in sequence of:

(a) preparing a kneaded mixture of cement, (b) pouring the resulting kneaded mixture into a form or on a bed wherein reinforcing steel is laid to form a stress absorbing portion of the cement about the reinforcing steel, (c) molding a molded body of the cement, (d) curing the molded body of cement, (e) applying a glaze onto a surface of the cured molded body of cement, (f) burning the glazed molded body of cement (g) cooling the burned molded body of cement, (h) hydrating to harden the cooled molded body of cement, wherein the action of generating cracks while burning and cooling, which is caused by the difference between the coefficient of thermal expansion between the reinforcing steel and a portion of the cement material, is absorbed by a stress absorbing portion around the reinforcing steel, the stress absorbing portion comprising a stress absorbing layer of pearlite powder mortar coated on the reinforcing steel and foam light-weight aggregate which includes at least one member selected from the group consisting of volanic gravel, pumice, lava, pearlite powder, pearlite aggregate, foamed soda glass, foamed shale, coal ash and slag; and a reaction of an unreacted cement component is promoted by the hydration to harden for recovering mechanical strength.

10. A glazed cement product manufactured according to claim 9.

11. A method of claim 9, wherein the reinforcing steel is prestressed before the kneaded mixture is poured into the form or bed, and wherein the action of generating cracks during the burning step is absorbed by the prestressing given to the reinforcing steel.

12. A glazed cement product manufactured according to claim 11.

* * * * *

UNITED STATES PATENT AND TRADEMARK OFFICE
CERTIFICATE OF CORRECTION

PATENT NO. : 4,797,319

DATED : January 10, 1989

INVENTOR(S) : Shigeo YOSHIDA et al

It is certified that error appears in the above-identified patent and that said Letters Patent is hereby corrected as shown below:

Column 1, line 43, "inceasing" should read --increasing--;
line 63, "mold" should read --molded--.

Column 3, line 12, "is occured" should read --is difficultly occured--;
line 55, "mortal" should read --mortar--.

Column 4, line 48, "large cement" should read --large, cement--;
line 49, "strength" should read --strength of the--.

Column 6, line 23, "the mixture of cement kneaded" should read --the kneaded mixture of cement--.

Column 7, line 66, "measurment" should read --measurement--.

Column 8, line 24, "use foam" should read --use of foam--;
line 49, "illustated" should read --illustrated--;
line 52, "numericaly" should read --numerically--.

Column 9, line 23, "m;anufactured" should read --manufactured--.

Column 10, line 5, "reniforcing" should read --reinforcing--;
line 10, "aocording" should read --according--.

Signed and Sealed this

Thirty-first Day of October, 1989

*Attest:*

DONALD J. QUIGG

*Attesting Officer* *Commissioner of Patents and Trademarks*